(12) United States Patent
Daniel et al.

(10) Patent No.: US 6,776,344 B2
(45) Date of Patent: Aug. 17, 2004

(54) PROBE SIGNALLING

(75) Inventors: Christopher J Daniel, Dursley (GB); Peter K Hellier, North Nibley (GB)

(73) Assignee: Renishaw PLC, Wotton-under-Edge (GB)

(*) Notice: Subject to any disclaimer, the term of this patent is extended or adjusted under 35 U.S.C. 154(b) by 97 days.

(21) Appl. No.: 09/959,206

(22) PCT Filed: Mar. 1, 2001

(86) PCT No.: PCT/GB01/00878
§ 371 (c)(1),
(2), (4) Date: Oct. 22, 2001

(87) PCT Pub. No.: WO01/67033
PCT Pub. Date: Sep. 13, 2001

(65) Prior Publication Data
US 2002/0158136 A1 Oct. 31, 2002

(30) Foreign Application Priority Data
Mar. 4, 2000 (GB) .................................. 0005166

(51) Int. Cl.[7] .................................................. G06K 7/10
(52) U.S. Cl. .............................. 235/472.02; 235/472.01
(58) Field of Search ...................... 235/472.01, 472.02

(56) References Cited

U.S. PATENT DOCUMENTS

| | | | | |
|---|---|---|---|---|
| 4,717,913 A | * | 1/1988 | Elger | 340/10.1 |
| 5,243,430 A | * | 9/1993 | Emmons | 348/734 |
| 5,778,550 A | | 7/1998 | Carli et al. | |
| 5,902,989 A | * | 5/1999 | Metlitsky et al. | 235/472.01 |
| 5,903,369 A | | 5/1999 | Hirayama et al. | |
| 6,000,612 A | * | 12/1999 | Xu | 235/454 |

FOREIGN PATENT DOCUMENTS

| | | |
|---|---|---|
| DE | 41 33 999 A1 | 4/1993 |
| EP | 0 587 066 A1 | 3/1994 |
| EP | 0 337 669 B1 | 6/1994 |
| FR | 2 716 318 A1 | 8/1995 |
| FR | 2 756 119 A1 | 5/1998 |
| GB | 2 141 365 A | 12/1984 |

OTHER PUBLICATIONS

Infrared Probe 25.00–ADR Product Description, www.m-h-inprocess.com, Pre–Mar. 4, 2000.

* cited by examiner

Primary Examiner—Mark Tremblay
(74) Attorney, Agent, or Firm—Oliff & Berridge, PLC

(57) ABSTRACT

A measurement probe 1 for a machine tool has a housing 4/5 incorporating a window 6 which allows the optical transmission or receipt of signals from/to infrared transmitters 12 or receivers 13. To obviate the need to mount the transmitter and receiver components on an external surface of the housing, they are surface mounted to a circuit board 8'.

8 Claims, 3 Drawing Sheets

PROBE SIGNALLING

The present invention relates to an improved structure for a probe which utilises transmission of signals, e.g. representing stylus triggering information for measuring physical dimensions.

Probes for dimensional measurement have been used without wires for transmitting signals representing coordinates to a fixed base station (e.g. on a machine tool).

Signals are known to be transmitted using infrared light, radio waves or inductively, and a number of transmitters and receivers for the signals are generally mounted on an external surface of the probe. One such probe is shown in European Patent No. 337669.

In hostile conditions these transmitters/receivers can become damaged. Additionally each needs to be sealed against ingress of foreign materials into the probe.

One such commercially available probe uses a window to cover and protect infrared transmitters/receivers. This window can be in the form of an annular ring covering a recessed row of transmitters/receivers. The transmitters/receivers need to be mounted to an external surface of the probe inside the window.

The present invention provides a measurement probe comprising a housing having a signal transmitter and/or receiver and a circuit board therein and comprising a window transparent to the signal, characterised in that the said transmitter and/or receiver is mounted to the circuit board, adjacent the window.

Preferably the window is in the form of an annulus.

Preferably the said transmitter and/or receiver is a plurality of infrared transmitter and receiver components which may be spaced within and around the annulus. The circuit board may be placed within the annular window and may be bent at lines of weakness. The window may be fully or partially transparent to the light and may include a filter and/or visually attractive coating.

Embodiments of the invention are described herein by way of non-limiting example, with reference to the accompanying drawings where:

Figure 1:
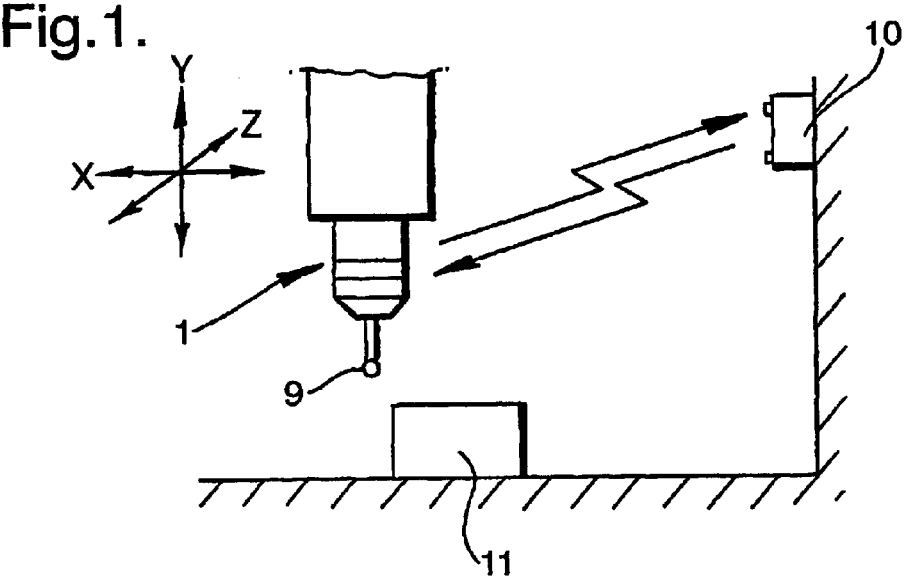
FIG. 1 shows a general view of a probe of the type used for this invention.

Referring to FIG. 1 a probe 1 is shown mounted to a machine. The probe is movable to determine the dimensions of some article 11. Stylus 9 is used to touch the article 11 and determine physical dimensions. Wireless communication is conducted between probe 1 and base station 10, the signals therebetween representing a trigger signal upon contact with the article 11, for example. A plurality of transmitters and/or receivers may be used on the probe to enable uninterrupted communication with the base station. Multiple base stations might be employed, allowing the use of just a single or a few transmitters/receivers in the probe.

Figure 2:
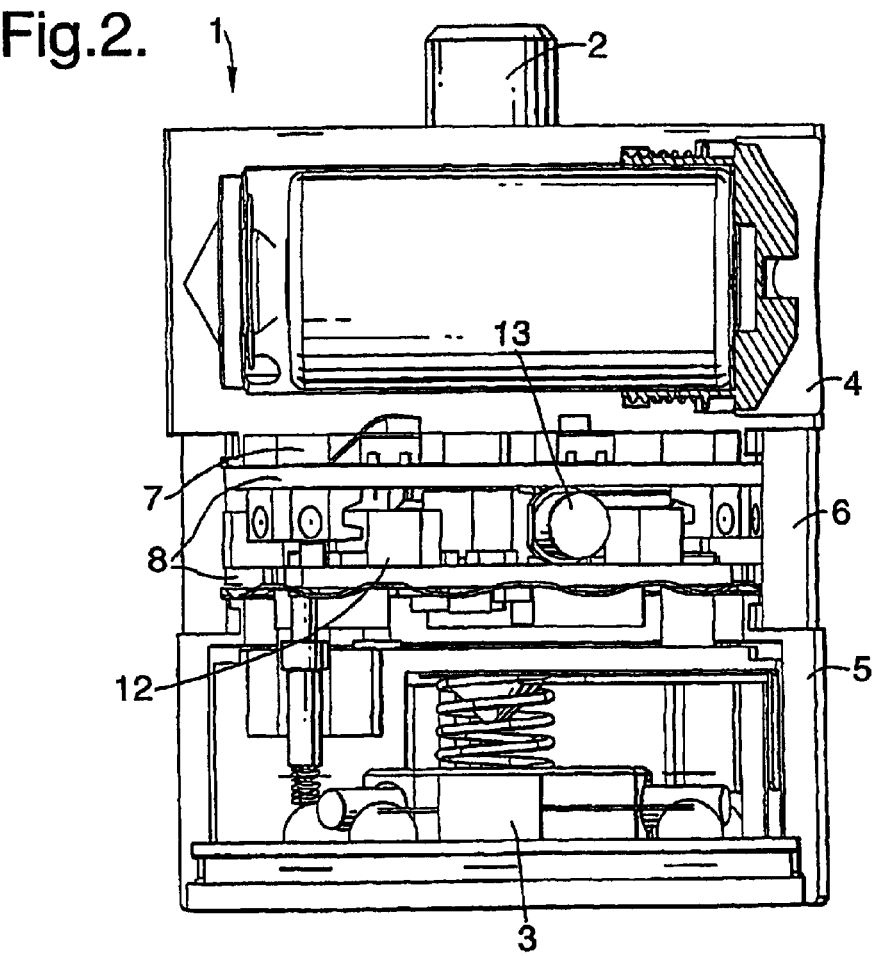
FIG. 2 shows a section of a first embodiment of a probe according to the invention.

Referring to FIG. 2 probe 1 is shown in cross-section. Spigot 2 would in use be mounted to a machine tool shank or the like and measurement stylus 9 would be fitted to stylus holder 3. Upper and lower housing parts 4 and 5 form the body of the probe, together with a signal-transparent annular portion 6. Three bolts 7 hold the housing parts 4 and 5 together, and clamp therebetween signal-transparent portion 6.

In this embodiment the annular portion is a boro-silicate glass providing a structural element of the probe body and forming a window for infrared light to pass to and from transmitters/receivers 12/13 surface mounted to circuit boards 8 within the probe. In this instance infrared receivers and transmitters and LEDs are surface mounted to the board 8 and infrared light signals can pass through the window 6 from/to base station 10 directly from or to the boards 8. The window is shown sealed at its inner surface, but could of course be sealed at its annular end faces. The window provides a means of filtering unwanted light frequencies.

Figure 3:
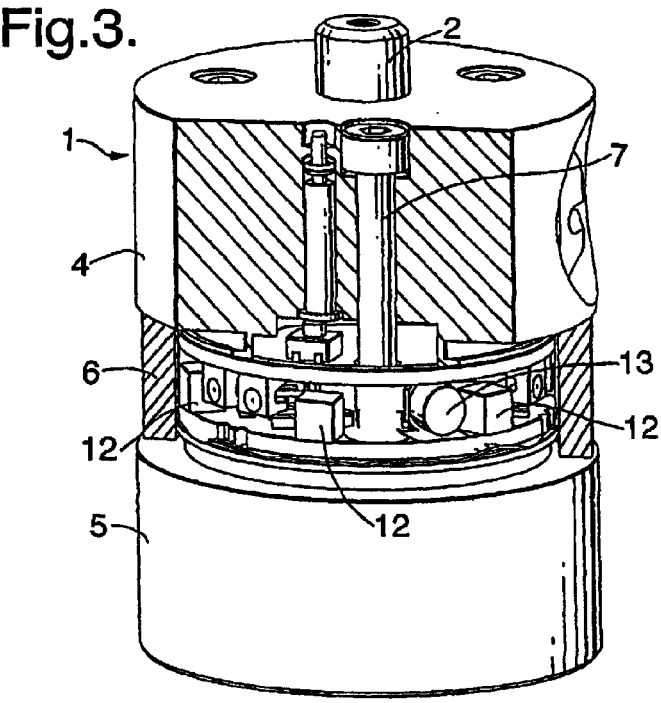
FIG. 3 shows a perspective view, partially sectioned of the probe shown in FIG. 2.

FIG. 3 shows a further view of the probe of the present invention, with like numbered parts.

Figure 5:
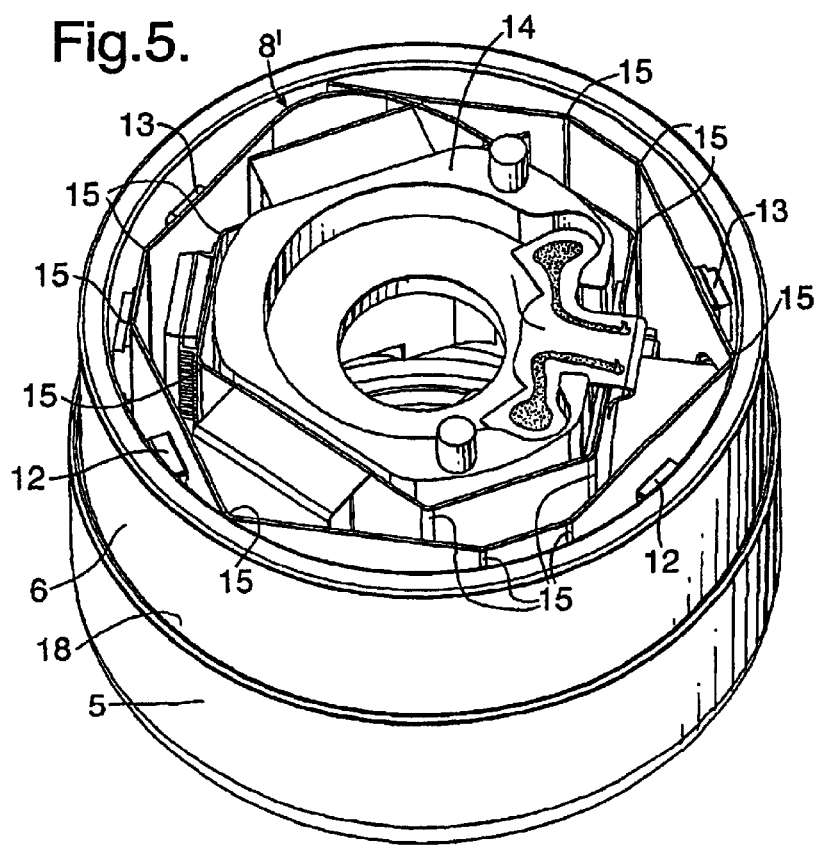
FIGS. 4 and 5 show a second embodiment of a probe according to the invention.
Figure 4:
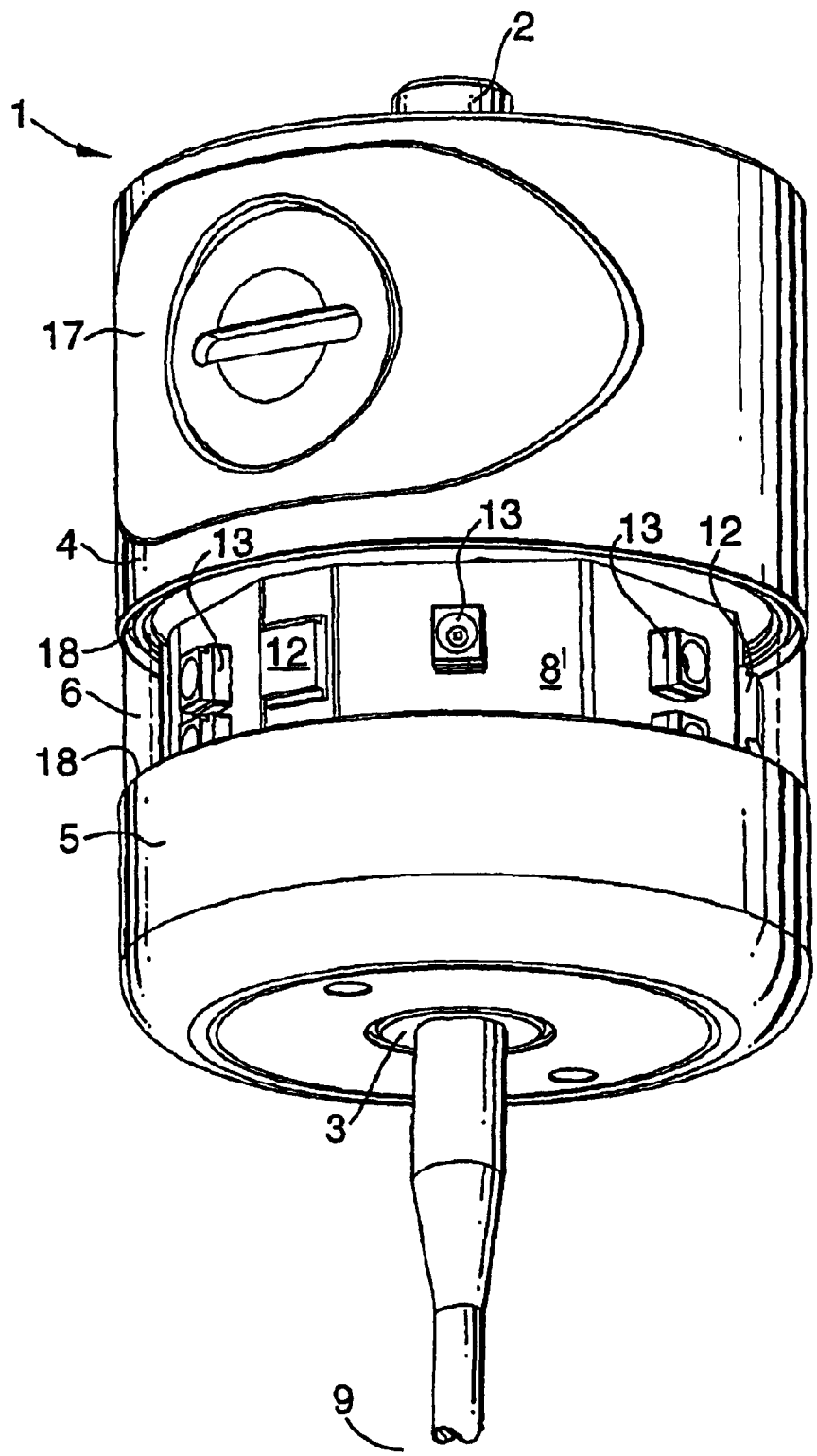

FIGS. 4 and 5 show a modified probe. This embodiment is similar to the embodiment shown in FIGS. 2 and 3. Parts common to the embodiment shown in FIGS. 2 and 3 and the embodiment shown in FIGS. 4 and 5 have like reference numerals.

In this embodiment upper and lower housings 4 and 5 are joined by a central pillar 14 which does not compress annular glass or plastics window 6 other than to provide a seal (at seals 18) around the edges of the window. Therefore, in this embodiment, the window does not form a rigid part of the structure of the probe. Infrared transmitters and receivers 12/13 are spaced around the window 6 and are mounted to the surface of a circuit board 8' inside the probe e.g. either affixed (e.g. by soldering) directly to the surface of the board or affixed snugly to the board and held in place by through pins (possibly soldered). Circuit board 8' is a relatively rigid substrate bent into a polygon. Bending of the circuit board is made possible by reducing the thickness of the board at intervals to produce lines of weakness (15 FIG. 5). The board can then be bent, at the lines of weakness, into the desired shape.

FIG. 5 shows a view with upper body 4 removed. Circuit board 8' is shown formed around pillar 14 and overlaps itself in order that a larger area of board can be used. Part 16 of the board 8' is used as a contact area for sprung-loaded pins in the upper body 4. The pins (not shown) supply power to the board from a battery compartment 17 in the upper body 4.

The probe shown in FIGS. 4 and 5 like the probe shown in FIGS. 2 and 3 has surface mounted electrical components, in particular infrared transmitters and receivers, within the body of the probe and adjacent a window transparent to infrared light. This construction reduces the complexity of the probe, reduces costs, affords a more reliable seal against the ingress of foreign materials e.g. machining coolant, and reduces the risk of accidental damage of the surface mounted components. No flying leads are required for transmitters/receivers which hitherto were mounted off the circuit boards 8,8'. In the first embodiment, the glass portion 6 forms part of the structure of the probe so a simpler construction is realised.

What is claimed is:

1. A probe for dimensional measurement and for optical wireless communication with a base station, the probe comprising:

a housing;

a window at the housing;

a circuit board which is bent and positioned within the housing adjacent the window; and at least one optical signal transmitter or receiver mounted to the circuit board for optical signal communication with the base station during use;

wherein the window is transparent to the optical signal and is disposed around the circuit board such that the optical signal may pass through the window to or from the base station.

2. A probe as claimed in claim 1, wherein the window is an annulus.

3. A probe as claimed in claim 1, wherein the said at least one signal transmitter or receiver is a plurality of transmitters or receivers.

4. A probe as claimed in claim 3, wherein the plurality of transmitters or receivers are spaced around the window on the circuit board.

5. A probe as claimed in claim 1, wherein the circuit board is positioned around the inside of the window.

6. A probe as claimed in claim 1, wherein the at least one transmitter or receiver is operable in the infrared spectrum.

7. A probe as claimed in claim 1, wherein the window is a filter.

8. A probe as claimed in claim 1, wherein the housing comprises two parts and the window is compressed between the two housing parts.

\* \* \* \* \*